US012703128B2

(12) United States Patent
Alglave et al.

(10) Patent No.: US 12,703,128 B2
(45) Date of Patent: Aug. 11, 2026

(54) METHOD FOR PRODUCING A MULTI-CELL COMPONENT

(71) Applicant: SAFRAN, Paris (FR)

(72) Inventors: Hugues Laurent Alglave, Moissy Cramayel (FR); Nicolas Pierre Lanfant, Moissy Cramayel (FR); Patrick Dunleavy, Moissy Cramayel (FR)

(73) Assignee: SAFRAN, Paris (FR)

( * ) Notice: Subject to any disclaimer, the term of this patent is extended or adjusted under 35 U.S.C. 154(b) by 76 days.

(21) Appl. No.: 18/711,409

(22) PCT Filed: Nov. 16, 2022

(86) PCT No.: PCT/FR2022/052096

§ 371 (c)(1),
(2) Date: May 17, 2024

(87) PCT Pub. No.: WO2023/089267

PCT Pub. Date: May 25, 2023

(65) Prior Publication Data

US 2025/0001653 A1 Jan. 2, 2025

(30) Foreign Application Priority Data

Nov. 19, 2021 (FR) ........................................ 2112244

(51) Int. Cl.
*B29C 43/02* (2006.01)
*B29C 43/36* (2006.01)
(Continued)

(52) U.S. Cl.
CPC ............ *B29C 43/021* (2013.01); *B29C 43/36* (2013.01); *B29C 43/52* (2013.01);
(Continued)

(58) Field of Classification Search
CPC ....... B29C 43/021; B29C 43/36; B29C 43/52; B29C 33/42; B32B 3/12; B29K 2995/0002
(Continued)

(56) References Cited

U.S. PATENT DOCUMENTS 5,912,442 A 6/1999 Nye et al.
2015/0027629 A1* 1/2015 Butler .................. G10K 11/168 156/306.6

FOREIGN PATENT DOCUMENTS

EP 0 889 459 A2 1/1999
FR 3 082 987 A1 12/2019
(Continued)

OTHER PUBLICATIONS

Oshima, M., et al., "English machine-translation by Clarivate Analytics of JP-2015224266-A with full JP patent application included" , May 26, 2014. (Year: 2014).*
(Continued)

*Primary Examiner* — Abbas Rashid
*Assistant Examiner* — Gregory C. Grosso
(74) *Attorney, Agent, or Firm* — CUSHMAN PARTNERS, LLC

(57) ABSTRACT

A method for producing a component including a plurality of hollow complex elements, includes: filling a plurality of molding cavities with a thermoplastic material, the mold being maintained at a first temperature, applying a hold pressure to the thermoplastic material while the mold is cooled to a second temperature, and interrupting the hold pressure on the thermoplastic material while the mold is cooled to a third temperature.

9 Claims, 7 Drawing Sheets

(51) Int. Cl.
*B29C 43/52* (2006.01)
*B29K 71/00* (2006.01)
*B29K 79/00* (2006.01)

(52) U.S. Cl.
CPC .... *B29K 2071/00* (2013.01); *B29K 2079/085* (2013.01); *B29K 2995/0002* (2013.01)

(58) Field of Classification Search
USPC .......................................................... 156/245
See application file for complete search history.

(56) References Cited

FOREIGN PATENT DOCUMENTS

| | | | |
|---|---|---|---|
| FR | 3 108 765 | A1 | 10/2021 |
| GB | 2 314 526 | A | 1/1998 |

OTHER PUBLICATIONS

Nishimura, Y., et al., "English machine-translation by Clarivate Analytics of CN-102099850-A with full CN patent application included", Jun. 1, 2009. (Year: 2009).*

Kato, T., et al., "English machine-translation by Clarivate Analytics of JP-3400344-B2 with full JP patent application included", Apr. 9, 1998. (Year: 1998).*

Abe, T., et al., "English machine-translation by Clarivate Analytics of JP-H10337755-A with full JP patent application included", Jun. 10, 1997. (Year: 1997).*

Minnich, J., et al., "English machine-translation by Clarivate Analytics of BR-112021026336-B1 with full BR patent application included", Jun. 29, 2020. (Year: 2020).*

International Search Report as issued in International Patent Application No. PCT/FR2022/052096, dated Apr. 26, 2023.

* cited by examiner

[Fig. 1]
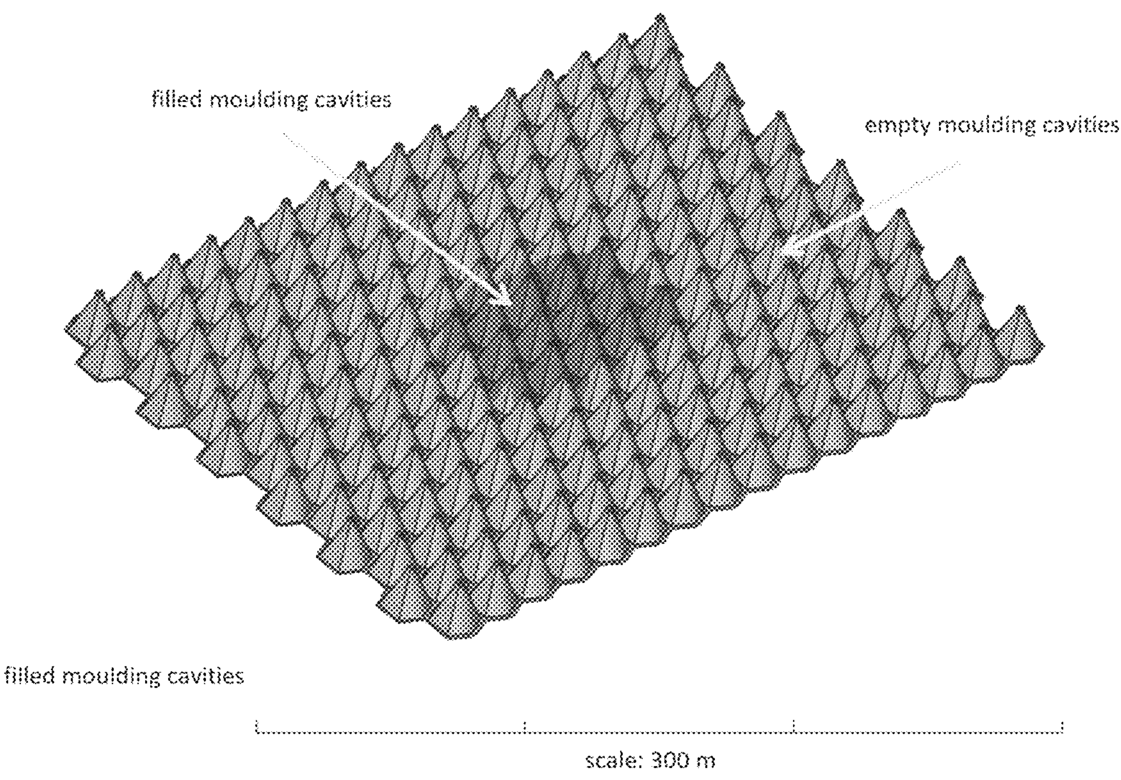
[Fig. 2]
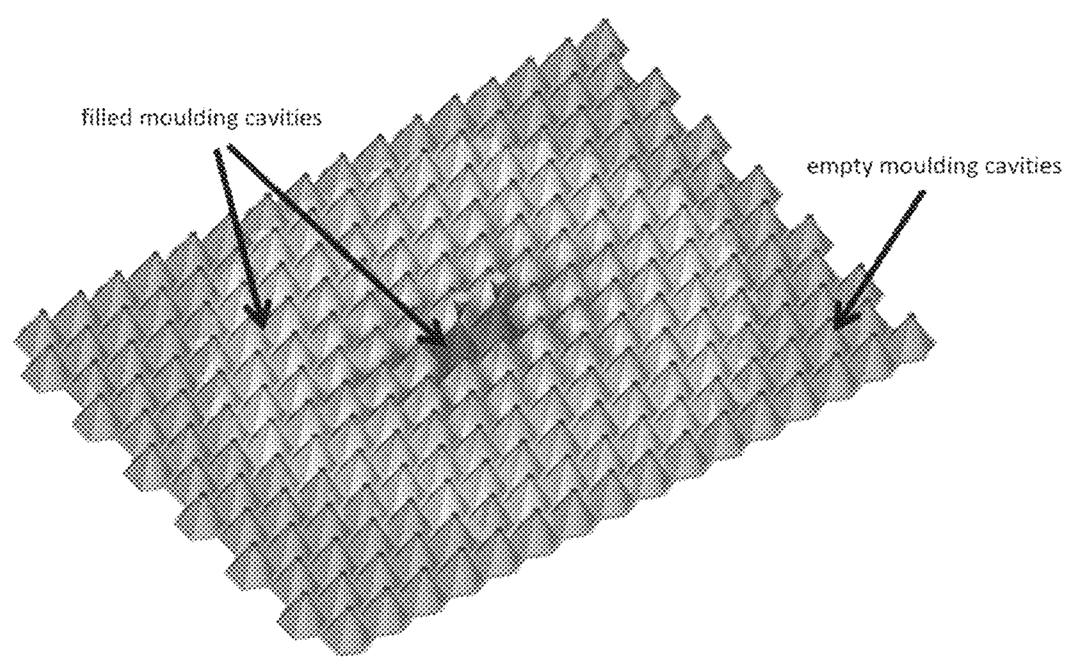

[Fig. 3]
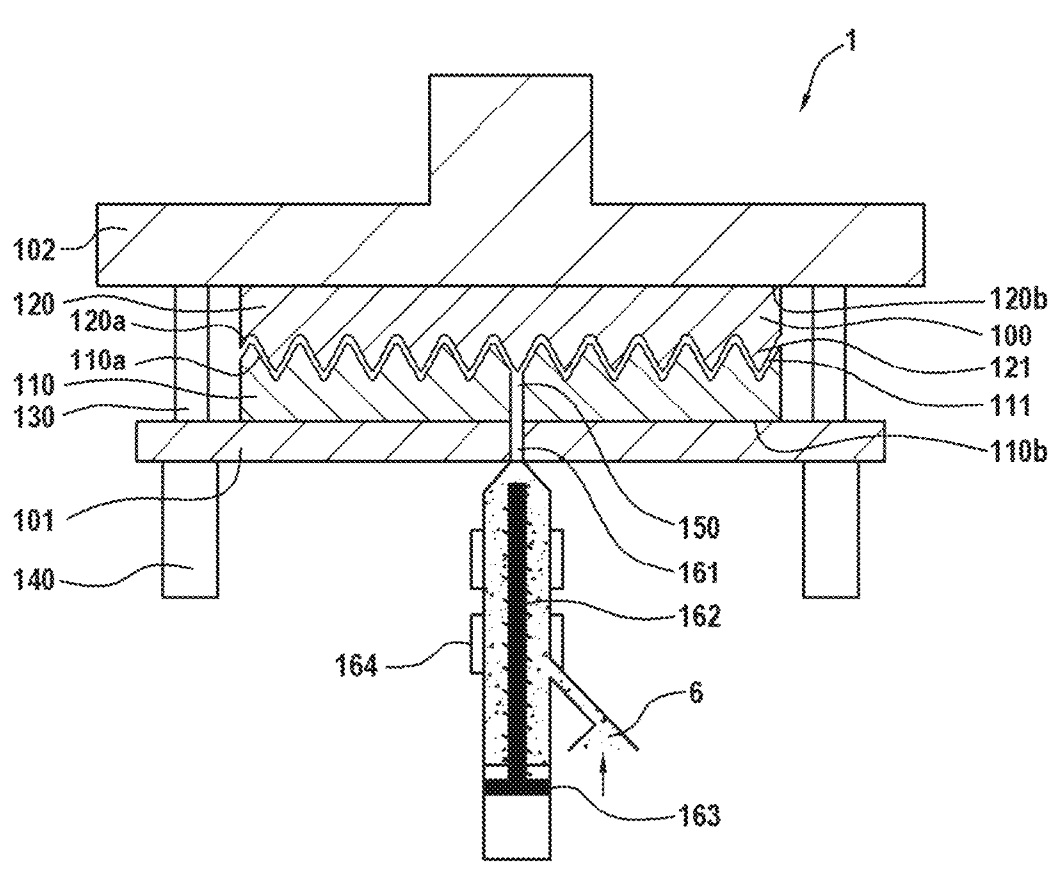

[Fig. 4]
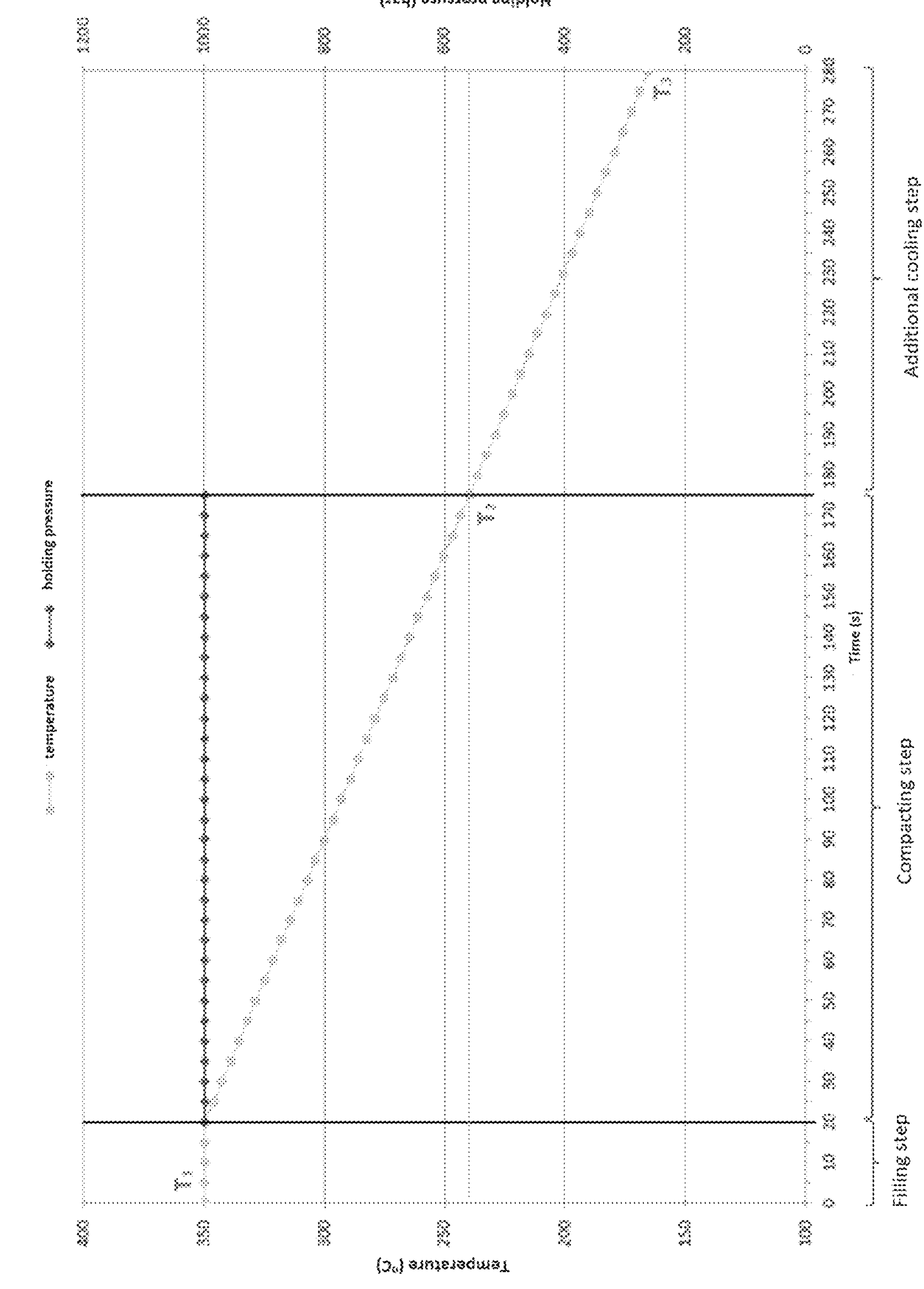

[Fig. 5]
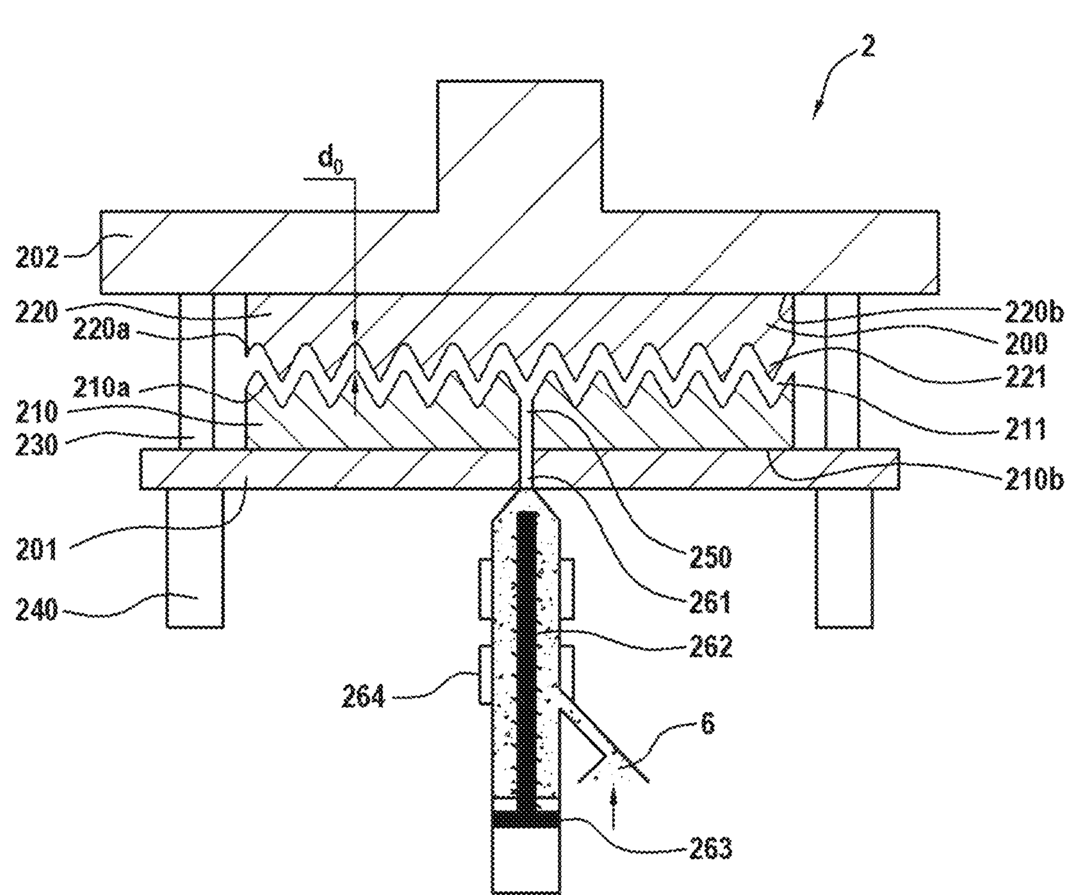

[Fig. 6]
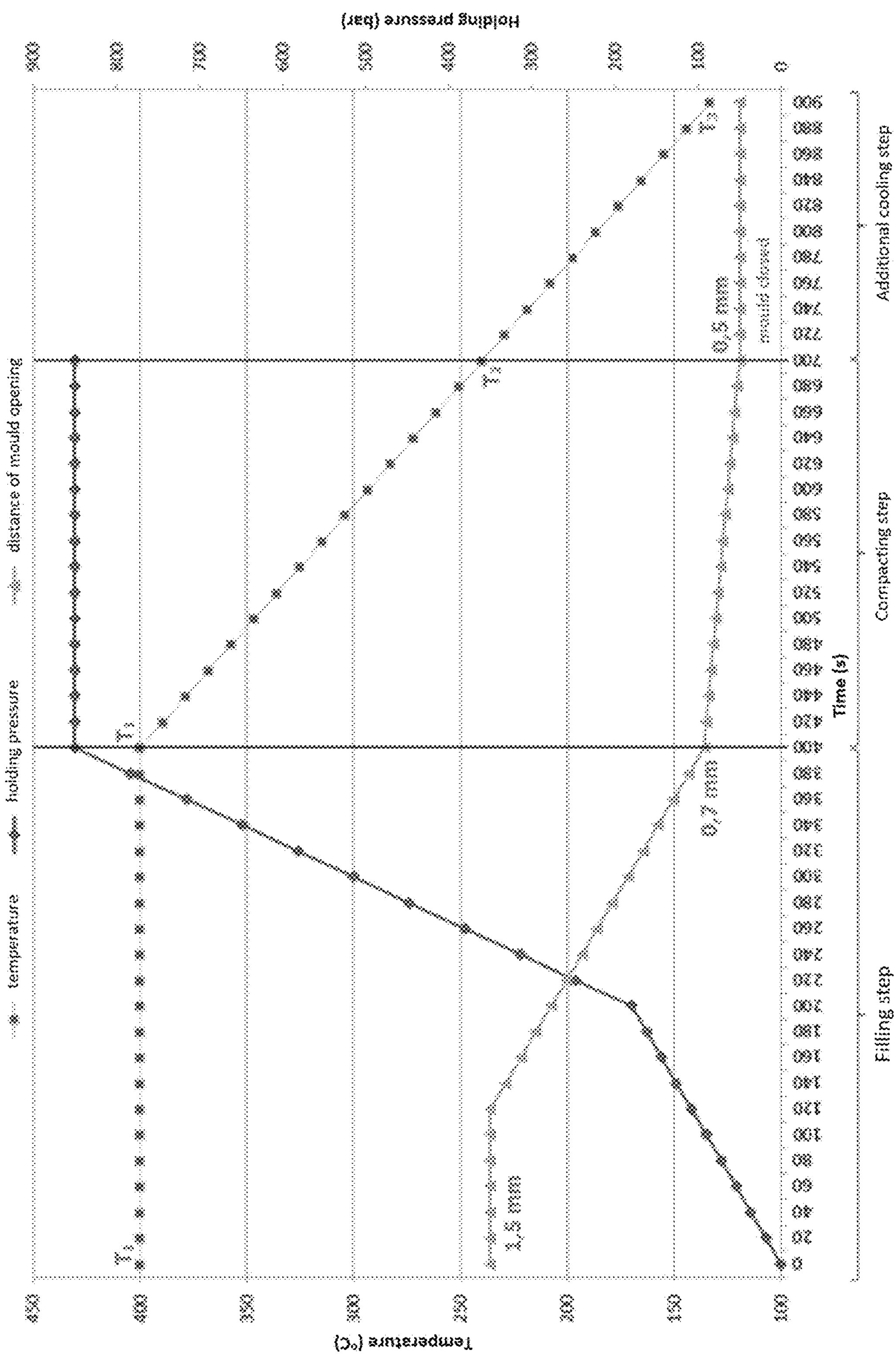

[Fig. 7]
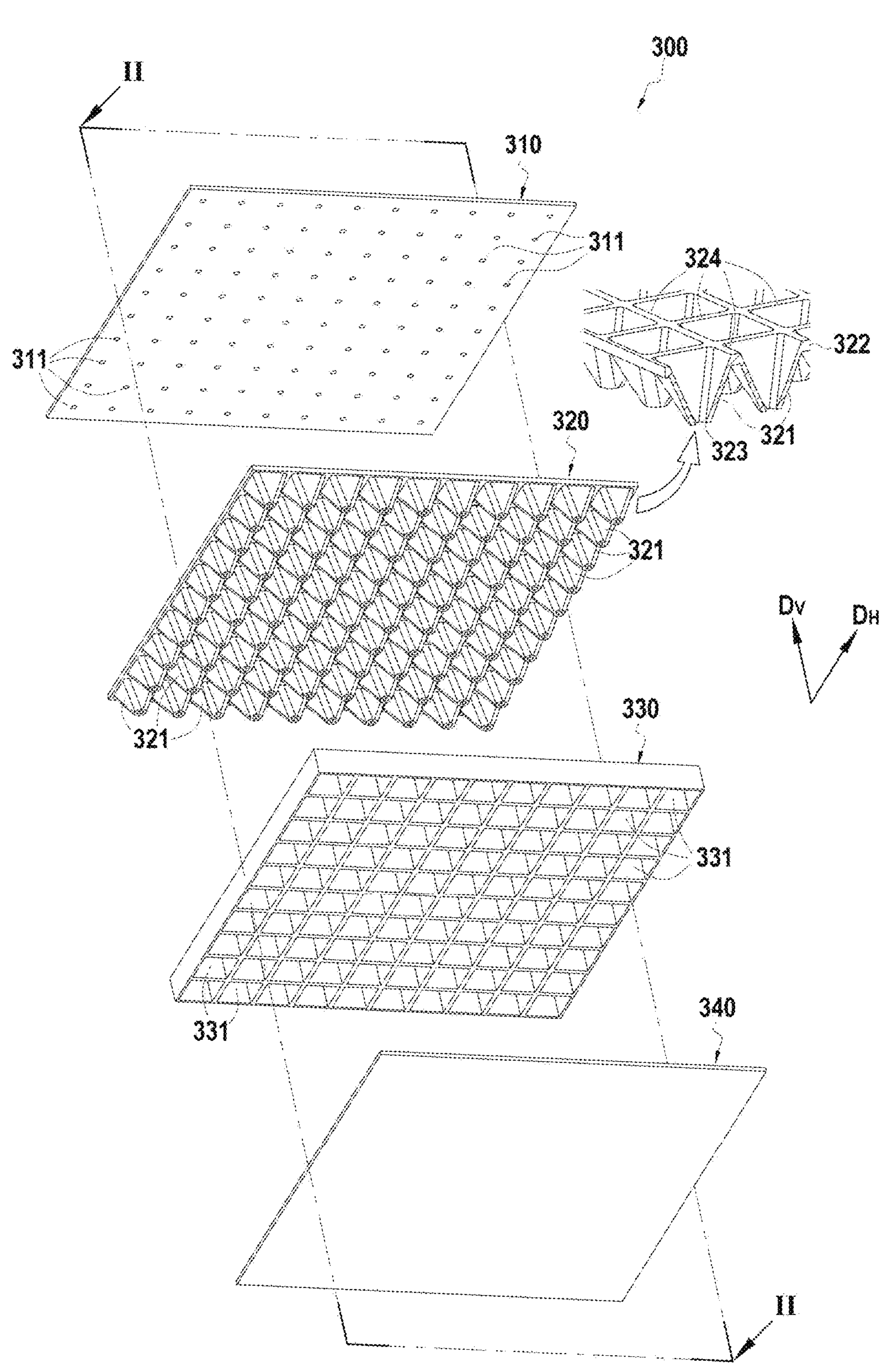

[Fig. 8]
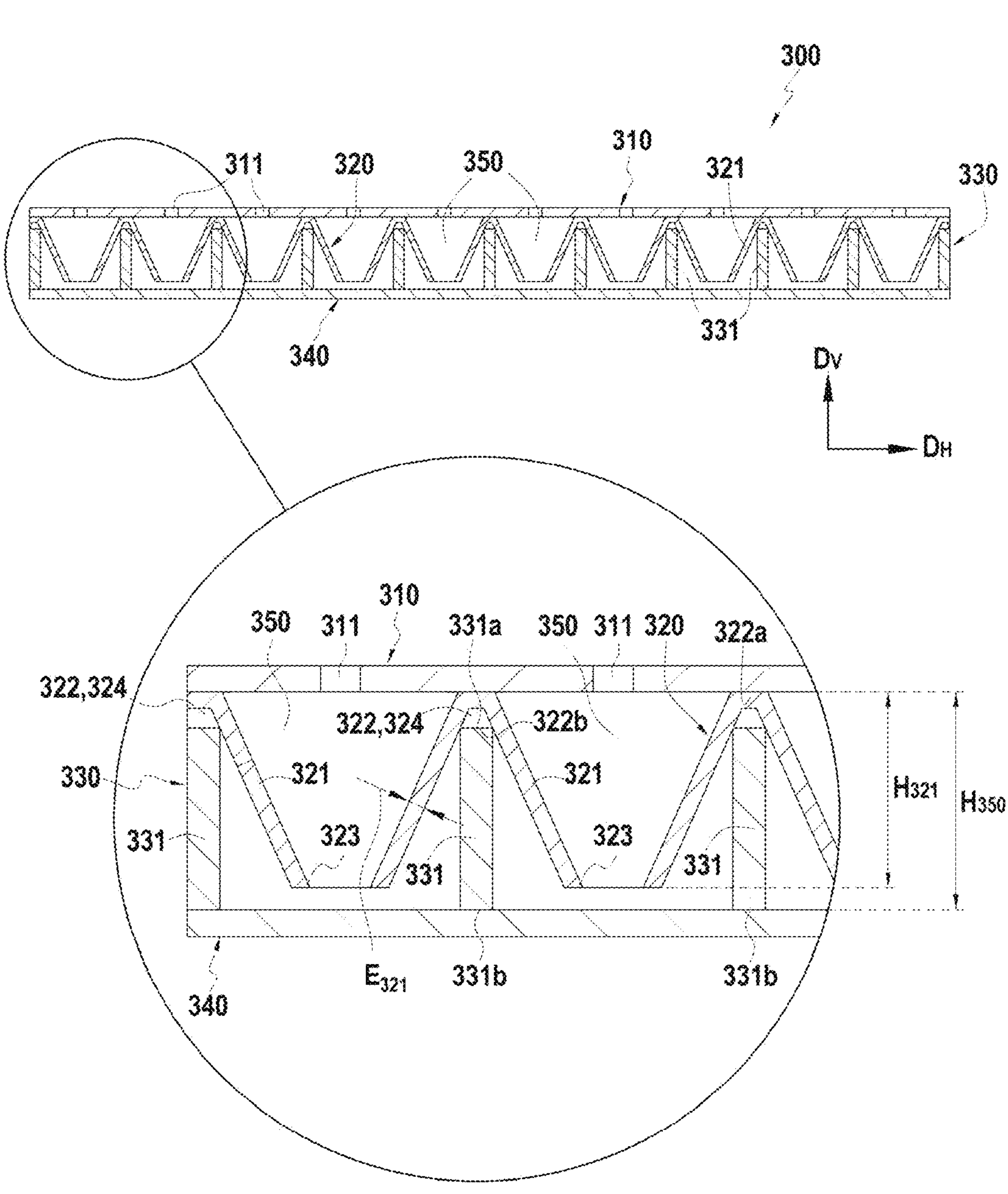

METHOD FOR PRODUCING A MULTI-CELL COMPONENT

CROSS-REFERENCE TO RELATED APPLICATIONS

This application is the U.S. National Stage of PCT/FR2022/052096, filed Nov. 16, 2022, which in turn claims priority to French patent application number 2112244 filed Nov. 19, 2021. The content of these applications are incorporated herein by reference in their entirety.

TECHNICAL FIELD

The present invention relates to the general field of structures or panels comprising a plurality of complex hollow elements, each having a shape tapering gradually between a base and an apex. It relates, more particularly but not exclusively, to acoustic attenuation structures used to reduce the noise produced by airplane engines such as gas turbines or exhausts thereof.

PRIOR ART

Acoustic attenuation structures typically consist of an acoustic surface plate or skin that is permeable to the acoustic waves that it is desired to attenuate, and a reflective solid plate or skin referred to as a "closure plate", a cellular body, such as a honeycomb or a porous structure, being disposed between these two walls. In a well-known manner, such panels form Helmholtz resonators which can attenuate acoustic waves in a certain frequency range. Acoustic attenuation structures of this type are described, in particular in documents U.S. Pat. No. 5,912,442 and GB 2 314 526.

These acoustic attenuation structures are limited to simple cell shapes such as those of the honeycomb cells of a conventional NIDA® structure. Consequently, the acoustic performances obtained are limited to the absorption of a very narrow range of frequencies.

A solution for increasing the acoustic attenuation frequency range is to superpose two cellular bodies having different cell shapes and dimensions. This solution has the disadvantage of significantly increasing the size of the acoustic attenuation structure.

Another known solution consists in placing open truncated cones in the cells, as described in document FR 3 082 987. Although this solution enables the size of the acoustic attenuation structure to be reduced, the mass of the structure nevertheless remains significant and, consequently, penalising for uses in aircraft where control of the overall mass is always sought.

The acoustic components are conventionally produced by injection in a closed mould, which represents a particularly low cost embodiment. However, conventional injection processes do not allow the production of very lightweight and low-size acoustic components, in particular in the case of acoustic structures with large dimensions.

DISCLOSURE OF THE INVENTION

The main goal for the present invention is therefore to provide a solution for producing components comprising a plurality of complex hollow elements overcoming the above-mentioned disadvantages.

In accordance with the invention, this goal is achieved by a method for producing a component comprising a plurality of complex hollow elements each having a shape tapering gradually between a base and an apex, the complex hollow elements being connected to one another by one or more adjacent edges, the method comprising:

filling, by a thermoplastic material, of a plurality of moulding cavities having a shape corresponding to the shape of the complex hollow elements of the component to be produced, the mould being held at a first temperature greater than the setting temperature of the thermoplastic material, then applying a holding pressure on the thermoplastic material while the mould is cooled until reaching a second temperature, interrupting the holding pressure on the thermoplastic material while the mould is cooled until reaching a third temperature, and removing a complex multielement component comprising a plurality of complex hollow elements from the mould.

The method of the invention makes it possible to economically, reliably and repeatedly obtain multielement components of complex shape, having a very low wall thickness, typically less than 0.5 mm. The multielement component thus obtained enables the production of structures, for example for acoustic attenuation, that are thinner and therefore lighter, while respecting the required specifications in terms of size, mechanical performance and mass.

By controlling the temperature at the surface of the mould, and in particular by performing a controlled cooling, better control is obtained of the setting and crystallisation of the thermoplastic material. Thus, it is possible to obtain a better microstructure and finer wall thicknesses than with a conventional injection method.

In addition, in the method of the invention, all the moulding cavities are filled before the thermoplastic material starts to set, if the temperature is too low for too long, or begins to deteriorate, if the temperature is too high for too long. Thus, it is possible to obtain good-quality components having larger dimensions than with a conventional injection method.

It is understood that the application of the holding pressure is carried out simultaneously with the cooling to the second temperature. It is also understood that the holding pressure is applied while the mould is cooled until the second temperature is reached, which does not exclude applying the holding pressure, at least partially, during the filling by the composite material.

According to a particular feature of the invention, the mould comprises a first part which comprises the plurality of moulding cavities, and a second part located facing the first part, the filling of the moulding cavities by the thermoplastic material being carried out while the first part and the second part of the mould are spaced apart by an opening distance strictly greater than the value of the thickness of the multielement component to be produced, and the cooling from the second temperature to the third temperature being carried out while the first part and the second part of the mould are spaced apart by a distance corresponding to the thickness of the multielement component to be produced.

By producing the component by injection-compression, in other words by injecting the thermoplastic material into a partially-open mould, it is possible to obtain even finer walls for the component. More particularly, by injecting the thermoplastic material into a partially-open mould, the pressure necessary for filling the cavity of the mould is lower and therefore more easily compatible with existing industrial injection means. Moreover, the channels between the moulding cavities become obstructed less, even if the thermoplastic material starts to set prematurely.

According to another particular feature of the invention, the opening distance is less than or equal to three times the value of the thickness of the walls of the complex multielement component to be produced.

According to another particular feature of the invention, the cooling of the mould from the first temperature to the second temperature is carried out at a cooling rate greater than 30° C. per minute.

According to another particular feature of the invention, the cooling of the mould from the second temperature to the third temperature is carried out at a cooling rate greater than 30° C. per minute.

According to another particular feature of the invention, the holding pressure on the thermoplastic material is between 50 bars and 2000 bars.

According to another particular feature of the invention, the flow rate of thermoplastic material during the filling is greater than a minimum flow rate corresponding to the ratio between the volume of thermoplastic material used and 80% of the degradation time of the thermoplastic material at the injection temperature chosen.

According to another particular feature of the invention, the thermoplastic material is a polyetherimide, the first temperature being between 250° C. and 420° C., the second temperature being between 190° C. and 250° C. and the third temperature being less than 190° C.

According to another particular feature of the invention, the thermoplastic material is a polyaryletherketone, the first temperature being between 320° C. and 420° C. and the third temperature being less than 300° C. In the case of a polyaryletherketone, the second temperature is typically between 300° C. and 320° C.

According to another particular feature of the invention, the thickness of the walls of the complex elements produced is less than 0.5 mm.

According to another particular feature of the invention, the length and the width of the multielement component complexes produced are greater than 200 mm.

The invention further relates to a method for producing an acoustic attenuation structure, comprising the following steps:

- producing a complex multielement acoustic component according to the method of the invention,
- producing a complex multielement acoustic panel comprising the complex multielement acoustic components and a plurality of partitions forming acoustic cavities, each complex hollow element of the acoustic component being housed in an acoustic cavity so as to form an acoustic cell,
- assembling a face of the complex multielement acoustic panel with an assembly face of an acoustic skin.

BRIEF DESCRIPTION OF THE FIGURES

FIG. 1 illustrates a 3D model of the rate of filling of moulding cavities during a conventional injection for producing an acoustic component of length 300 mm and wall thickness 0.5 mm.

FIG. 2 illustrates a 3D model of the rate of filling of the moulding cavities during a conventional injection-compression, in order to produce an acoustic component of length 300 mm and wall thickness 0.5 mm.

FIG. 3 is a schematic sectional view of an injection tool enabling the production of an acoustic component according to a first embodiment of the invention.

FIG. 4 illustrates an example of an injection cycle corresponding to the first embodiment of the invention.

FIG. 5 is a schematic sectional view of an injection-compression tool enabling the production of an acoustic component according to a second embodiment of the invention.

FIG. 6 illustrates an example of an injection cycle corresponding to the second embodiment of the invention.

FIG. 7 is a perspective exploded schematic view of an acoustic attenuation structure according to an embodiment of the invention.

FIG. 8 is a schematic sectional view of the acoustic attenuation structure of FIG. 7 once assembled.

DESCRIPTION OF THE EMBODIMENTS

The invention applies to the production of components comprising a plurality of complex hollow elements, each having a shape tapering gradually between a base and an apex, the complex hollow elements being connected to one another by one or more adjacent edges. The complex hollow elements can correspond, in particular but not exclusively, to acoustic elements of an acoustic component.

The embodiments described below relate to an acoustic component, but can be applied to other types of components, without going beyond the scope of the invention.

The conventional injection methods have been studied in the context of acoustic components with large dimensions but having low wall thicknesses. FIG. 1 is a model of the filling of moulding cavities using a conventional injection method, if it is desired to produce an acoustic attenuation component of length 300 mm and wall thickness 0.5 mm. The injection according to the conventional injection method is carried out from the centre of the mould which is closed and controlled at a material ejection temperature throughout the injection cycle. The parts in dark grey represent the filled moulding cavities. In this configuration, it can be seen that only the moulding cavities located close to the point of injection are filled, the cavities further away remain empty.

In order to improve the level of filling of the cavities of the mould, conventional injection-compression methods have also been studied. FIG. 2 is a model of the filling of moulding cavities using a conventional injection-compression method, in order to produce an acoustic component of length 300 mm and wall thickness 0.5 mm. In this configuration, the thermoplastic material is injected into a partially-open mould, from the centre of the mould, which is controlled at a material ejection temperature throughout the injection cycle. However, it is observed that even if the level of filling is better than in the preceding case, the cavities further away are not correctly filled, or even totally empty.

Since conventional injection and injection-compression are insufficient, it is proposed to control the temperature of the mould during the injection or injection-compression method.

FIGS. 3 and 4 illustrate a method for producing an acoustic component conforming to a first embodiment of the invention, wherein the introduction of the material is carried out while the mould is closed.

FIG. 3 illustrates a tool 1 comprising a mould 100 having a first part 110 and a second part 120 disposed facing one another.

The first part 110 of the mould 100 comprises, on a first face 110*a*, moulding cavities 111 having a shape corresponding to the shape of the complex hollow acoustic elements of the acoustic component to be produced.

The second part 120 of the mould 100 comprises, on a first face 120*a*, teeth 121 having a shape corresponding to the shape of the complex hollow acoustic elements of the acoustic component to be produced. The teeth 121 of the second part 120 of the mould 100 are intended to cooperate with the moulding cavities 111 of the first part 110 of the mould 100.

The moulding cavities 111 of the first part 110 of the mould 100 have a system for controlling the surface temperature, for example using a heat transfer fluid or air. Preferably, the teeth 121 of the second part 120 of the mould 100 also have a system for controlling the surface temperature.

The first face 110*a* of the first part 110 of the mould 100 and the first face 120*a* of the second part 120 of the mould 100 are disposed facing one another, so that the teeth 121 of the second part 120 of the mould 100 are disposed facing the moulding cavities 111 of the first part 110 of the mould 100.

A second face 110*b* of the first part 110 of the mould 100, opposite the first face 110*a*, is disposed on a first plate 101. A second face 120*b* of the second part 120 of the mould 100, opposite the first face 120*a*, is disposed on a second plate 102. The first plate 101 and the second plate 102 are movable with respect to one another, so as to allow closure of the mould 100 by moving the first part 110 towards the second part 120 of the mould 100, and so as to allow opening of the mould 100 by moving the first part 110 away from the second part 120 of the mould 100. The expression "closure of the mould" shall mean the position in which the surface of the moulding cavities 111 is spaced apart from the surface of the teeth 121 by a distance substantially identical to the thickness of the part to be produced. The first plate 101 and the second plate 102 can be guided by guide columns 130 and controlled by actuators 140, as illustrated in FIG. 3.

Preferably, the first plate 101 is stationary while the second plate 102 is movable.

The first part 110 of the mould 100 has at least one introduction orifice 150, preferably located at the centre of the mould 100, and enabling the introduction of a thermoplastic material 6 into the moulding cavities 111.

In the example illustrated in FIG. 3, the introduction of the thermoplastic material 6 is carried out by injection. Thus, the first plate 101 comprises at least one injection nozzle 161, located in the prolongation of the one or more injection orifices 150 of the first part 110 of the mould 100. The injection of thermoplastic material 6 through the injection nozzle 161 can be performed by means of a worm screw 162 and an injection actuator 163, the temperature of which can be adjusted by heating collars 164.

FIG. 4 illustrates an exemplary cycle corresponding to the first embodiment of the invention, wherein the injected composite material 6 is a polyetherimide (PEI).

The method starts by introducing a thermoplastic material 6 into the plurality of cavities 111 of the mould 100, called the filling step. The introduction of the thermoplastic material 6 is preferably performed by injection. The introduction of the thermoplastic material 6 is preferably performed from the centre of the mould 100.

The thermoplastic material used for making the acoustic component can be, in particular but not exclusively, selected from the following materials: polyaryletherketones (PAEK) such as polyetheretherketone (PEEK) and polyetherketoneketone (PEKK), polyetherimides (PEI), polycarbonate (PC), polyphenylene sulfide (PPS) and polysulfones (PSU). The thermoplastic material may or may not include a filler.

The temperature $T_i$ of the thermoplastic material 6 during this step is adapted to the method of introduction into the chosen mould. For example, if the thermoplastic material is a polyetherimide (PEI) and is injected, its temperature of introduction $T_i$ will typically be between 250° C. and 420° C. According to another example, if the thermoplastic material is a polyaryletherketone (PAEK) and is injected, its temperature of introduction $T_i$ will typically be between 320° C. and 420° C.

The mould 100 is heated beforehand before the introduction of the thermoplastic material 6, then controlled at a first heating temperature $T_1$ of the mould 100 throughout the duration of the introduction of the thermoplastic material 6. Preferably, the first temperature $T_1$ should be greater than the setting temperature of the thermoplastic material 6 in order to enable its introduction. This first heating temperature $T_1$ of the mould 100 corresponds to the surface temperature of the moulding cavities 111 of the first part 110 of the mould 100 and the temperature at the surface of the teeth 121 of the second part 120 of the mould 100 during the introduction of the thermoplastic material 6.

The first heating temperature $T_1$ of the mould is preferably close to the temperature of introduction $T_i$ of the thermoplastic material. For example, if the thermoplastic material is a polyetherimide (PEI), the first heating temperature $T_1$ of the mould will typically be between 250° C. and 420° C. According to another example, if the thermoplastic material is a polyaryletherketone (PAEK), the first heating temperature $T_1$ of the mould will typically be between 320° C. and 420° C.

The thermoplastic materials can be degraded if they are exposed to high temperatures for too long. Thus, the duration of the introduction of the thermoplastic material into the heated mould, preferably does not exceed a reference maximum time $t_{réf}$. This reference maximum time $t_{réf}$ corresponds to 80% of the degradation time $t_{dég\text{-}T_i}$ of the thermoplastic material at the chosen temperature of introduction $T_i$. The reference maximum time $t_{réf}$ is therefore calculated according to the following formula:

$$t_{réf} = 0.8 \times t_{dég-T_i} \quad \text{[Math. 1]}$$

For example, for a temperature of introduction $T_i$=400° C., the degradation time $t_{dég\text{-}400°\,C.}$ of the polyetherimide (PEI) is 10 minutes. The reference maximum time $t_{réf}$ will therefore be 8 minutes in this configuration.

In order to ensure the complete filling of the plurality of cavities 111 of the mould 100 in a time less than the reference maximum time $t_{réf}$, the introduction of the thermoplastic material 6 can be carried out at a flow rate greater than the reference minimum flow rate $Q_{réf}$. This reference minimum flow rate is chosen according to the total volume of thermoplastic material introduced $V_{total}$ and the reference maximum time $t_{réf}$. Thus, the reference minimum flow rate $Q_{réf}$ corresponds to the ratio between the total volume of thermoplastic material introduced total $V_{total}$ and the reference maximum time $t_{réf}$. The reference minimum flow rate $Q_{réf}$ is therefore calculated according to the following formula:

$$Q_{réf} = \frac{V_{total}}{t_{réf}} \quad \text{[Math. 2]}$$

For example, for a polyetherimide (PEI) introduced at a temperature $T_i$=400° C., the reference maximum time $t_{réf}$ will be 8 minutes, i.e. 480 seconds, as previously calculated. If the total volume of polyetherimide (PEI) to be introduced $V_{total}$ is 600 $cm^3$, the reference minimum flow rate $Q_{réf}$ will therefore be 1.25 $cm^3$ per second in this configuration.

Starting from the value of the reference minimum flow rate $Q_{réf}$, it is possible to determine an optimum flow rate value $Q_{opti}$ while seeking to reduce the injection pressure and the closure force of the mould required to ensure complete filling of the cavities. The optimum flow rate value $Q_{opti}$ is greater than or equal to the value of the reference minimum flow rate $Q_{réf}$, i.e.:

$$Q_{opti} \geq Q_{réf} \quad \text{[Math. 3]}$$

In order to precisely determine the optimum flow rate $Q_{opti}$ for introducing the thermoplastic material, tests are carried out enabling the filling of the plurality of cavities 111 of the mould 100 to be analysed, for example by a rheological study.

The thermal control carried out during this filling step makes it possible to obtain satisfactory filling of all the moulding 100 cavities 111, including the cavities furthest away from the injection points 150, while preventing any obstruction of the channels between the moulding cavities 111.

When the filling step is completed, i.e. when all the moulding cavities 111 are filled, a compacting step is carried out. During this compacting step, a suitable holding pressure is applied on the injected thermoplastic material. The holding pressure applied on the thermoplastic material is typically between 50 bars and 2000 bars. The holding pressure can be constant, as in the example illustrated in FIG. 4, or increasing or decreasing during the compacting step. The holding pressure may vary. A holding pressure can start to be applied from the filling step, in particular in order to reach a sufficient holding pressure from the start of the compacting step.

In addition, throughout the duration of the compacting step, the mould is cooled in a controlled manner from the first temperature $T_1$ to a second temperature $T_2$, which is preferably close to the setting temperature of the thermoplastic material.

This second temperature $T_2$ corresponds to the surface temperature of the moulding cavities 111 of the first part 110 of the mould 100 and the temperature at the surface of the teeth 121 of the second part 120 of the mould 100 during the compacting of the thermoplastic material.

The cooling rate $v_2$ of the mould during the compacting step is controlled, and is typically between 30° C. per minute and 100° C. per minute. Thus, the duration of compacting $t_{comp}$ of the thermoplastic material corresponds to the ratio of the difference between the first temperature $T_1$ and the second temperature $T_2$ divided by the cooling rate $v_2$, i.e.:

$$t_{comp} = \frac{T_1 - T_2}{v_2} \quad \text{[Math. 4]}$$

For example, if the thermoplastic material is a polyetherimide (PEI), the second temperature $T_2$ will typically be between 190° C. and 250° C., because the setting temperature of the polyetherimide (PEI) is approximately 240° C.

According to another example, if the thermoplastic material is a polyaryletherketone (PAEK), the second temperature $T_2$ will typically be between 300° C. and 320° C., because the setting temperature of the polyaryletherketone (PAEK) is approximately 300° C.

The controlled compacting step previously described makes it possible to control the final thickness of the part, by compensating the removals of material. The final geometry is thus improved and the porosity in the part obtained is reduced. The application of a holding pressure while controlling the cooling rate makes it possible to improve the microstructure of the final part, for example by ensuring a level of crystallinity close to the optimum, even in the case of very fine parts.

When the compacting step is completed, in other words when the second temperature $T_2$ is reached at the surface of the moulding cavities and the temperature at the surface of the teeth, an additional cooling step can be carried out. During this cooling step, there is no longer any holding pressure exerted on the thermoplastic material.

During this cooling step, the mould is cooled from the second temperature $T_2$ to a third temperature $T_3$, which is preferably sufficiently low to enable the ejection of the thermoplastic material. This additional cooling step can also enable a sufficiently low temperature of the thermoplastic material to be reached, in order to facilitate removal from the mould and handling of the moulded part.

This third temperature $T_3$ corresponds to the surface temperature of the moulding cavities 111 of the first part 110 of the mould 100 and the temperature at the surface of the teeth 121 of the second part 120 of the mould 100 during the additional cooling step of the thermoplastic material.

The cooling rate $v_3$ of the mould during the additional cooling step is typically between 30° C. per minute and 100° C. per minute. Thus, the additional cooling duration $t_{refr}$ of the thermoplastic material corresponds to the ratio of the difference between the second temperature $T_2$ and the third temperature $T_3$ divided by the cooling rate $v_3$, i.e.:

$$t_{refr} = \frac{T_2 - T_3}{v_3} \quad \text{[Math. 5]}$$

For example, if the thermoplastic material is a polyetherimide (PEI), the third temperature $T_3$ will typically be less than 190° C., because the desired ejection temperature for the polyetherimide (PEI) is approximately 180° C.

According to another example, if the thermoplastic material is a polyaryletherketone (PAEK), the third temperature $T_3$ will typically be less than 300° C., because the desired ejection temperature for the polyaryletherketone (PAEK) is approximately 300° C.

The cooling rate $v_3$ of the mould during the additional cooling step can be identical to the cooling rate $v_2$ of the mould during the preceding step. The cooling rates $v_2$ and $v_3$ may not be constant.

The additional cooling step is optional. More specifically, the second temperature $T_2$ can, in certain cases, already be sufficiently low to enable the ejection of the thermoplastic material. This configuration can for example be present if the thermoplastic material is a polyaryletherketone (PAEK), because the setting temperature of polyaryletherketone (PAEK) is close or even identical to the desired ejection temperature. However, this additional cooling step remains desirable for obtaining a sufficiently low temperature of the thermoplastic material in order to be able to easily handle the moulded part once removed from the mould.

This additional cooling step can again improve the microstructure of the material in the final part, by allowing a better control of the crystallisation of the material. This additional cooling is chosen so as to ensure the most satisfactory possible crystallisation, while limiting the cycle time.

When the additional cooling step is completed, the part thus moulded is sufficiently cold to be able to be removed from the mould, by separating the first part 110 of the mould 100 from the second part 120 of the mould 100.

Thus a complex multielement acoustic component is obtained, comprising a plurality of complex hollow acoustic elements, for which the width and/or the length can exceed 200 mm. The wall thickness of the complex hollow acoustic elements, and/or of the edges separating the hollow acoustic elements, can be less than 0.5 mm.

In the example illustrated in FIG. 3, the tool 1 is intended to produce pyramid-shaped complex hollow acoustic elements. However, it does not go beyond the scope of the invention if the tool enables the production of hollow acoustic elements having, for example, a conical, spiral, funnel or other shape. By contrast, the shape chosen for the complex hollow acoustic elements preferably enables their removal from the mould.

FIGS. 5 and 6 illustrate a method for producing an acoustic component conforming to a second embodiment of the invention, wherein the introduction of the material is carried out while the mould is not completely closed.

FIG. 5 illustrates a tool 2 comprising a mould 200 having a first part 210 and a second part 220 disposed facing one another.

The first part 210 of the mould 200 comprises, on a first face 210*a*, moulding cavities 211 having a shape corresponding to the shape of the complex hollow acoustic elements of the acoustic component to be produced.

The second part 220 of the mould 200 comprises, on a first face 220*a*, teeth 221 having a shape corresponding to the shape of the complex hollow acoustic elements of the acoustic component to be produced. The teeth 221 of the second part 210 of the mould 200 are intended to cooperate with the moulding cavities 211 of the first part 210 of the mould 200.

The moulding cavities 211 of the first part 210 of the mould 200 have a system for controlling the surface temperature, for example using a heat transfer fluid or air. Preferably, the teeth 221 of the second part 220 of the mould 200 also have a system for controlling the surface temperature.

The first face 210*a* of the first part 210 of the mould 200 and the first face 220*a* of the second part 220 of the mould 200 are disposed facing one another, so that the teeth 221 of the second part 220 of the mould 200 are disposed facing the moulding cavities 211 of the first part 210 of the mould 200.

A second face 210*b* of the first part 210 of the mould 200, opposite the first face 210*a*, is disposed on a first plate 201. A second face 220*b* of the second part 220 of the mould 200, opposite the first face 220*a*, is disposed on a second plate 202. The first plate 201 and the second plate 202 are movable with respect to one another, so as to allow closure of the mould 200 by moving the first part 210 towards the second part 220 of the mould 200, and so as to allow opening of the mould 200 by moving the first part 210 away from the second part 220 of the mould 200. In this second embodiment of the invention, the first plate 201 and the second plate 202 can also be disposed in an intermediate configuration, illustrated in FIG. 5, making it possible to hold the mould 200 partially open.

The first plate 201 and the second plate 202 can be guided by guide columns 230 and controlled by actuators 240, as illustrated in FIG. 5.

Preferably, the first plate 201 is stationary while the second plate 202 is movable.

The first part 210 of the mould 200 has at least one introduction orifice 250, preferably located at the centre of the mould 200, and enabling the introduction of a thermoplastic material 6 into the moulding cavities.

In the example illustrated in FIG. 5, the introduction of the thermoplastic material 6 is carried out by injection. Thus, the first plate 210 comprises at least one injection nozzle 261, located in the prolongation of the one or more injection orifices 250 of the first part 210 of the mould 200. The injection of thermoplastic material 6 through the injection nozzle 261 can be performed by means of a worm screw 262 and an injection actuator 263, the temperature of which is adjusted by heating collars 264.

FIG. 6 illustrates an exemplary cycle corresponding to the second embodiment of the invention, wherein the injected composite material is a polyetherimide (PEI).

The method starts by introducing a thermoplastic material 6 into the plurality of cavities 211 of the mould 200, called the filling step. The introduction of the thermoplastic material is preferably performed by injection. The introduction of the thermoplastic material is preferably performed from the centre of the mould. This filling step starts while the mould 200 is partially open, in order to reduce the pressure in the moulding cavities 211 during filling. By carrying out the filling in a partially-open mould, the production of finer parts and/or parts with larger dimensions is facilitated, particularly when the thermoplastic material is highly viscous.

The closure of the mould 200 preferably starts during the filling step, when at least one part of the volume of thermoplastic material required for producing the part has been introduced into the mould. The triggering of the closure of the mould can thus take place at any time after the start of the introduction of the composite material into the mould during the filling step. The closure of the mould can be completely achieved at the end of the filling step or, preferably continue even after the end of the filling step. The closure of the mould may also only start after the filling step, when the introduction of the composite material into the mould is achieved.

Preferably, at the end of the filling step, the movement of the movable part of the mould ensures a complete filling of the cavity of the mould by the thermoplastic material.

When the mould 200 is in the partially-open position as illustrated in FIG. 5, the opening distance do between the first part 210 of the mould 200 and the second part 220 of the mould 200 is strictly greater than one times the value of the wall thickness of the complex multielement acoustic component to be produced and preferably less than or equal to 3 times the value of the wall thickness of the complex multielement acoustic component be produced.

The thermoplastic material used for making the acoustic component can be, in particular but not exclusively, selected from the following materials: polyaryletherketones (PAEK) such as polyetheretherketone (PEEK) and polyetherketoneketone (PEKK), polyetherimides (PEI), polycarbonate (PC), polyphenylene sulfide (PPS) and polysulfones (PSU). The thermoplastic material may or may not include a filler.

The temperature $T_i$ of the thermoplastic material during this step is adapted to the method of introduction into the chosen mould. For example, if the thermoplastic material is a polyetherimide (PEI) and is injected, its temperature of introduction $T_i$ will typically be between 250° C. and 420°

C. According to another example, if the thermoplastic material is a polyaryletherketone (PAEK) and is injected, its temperature of introduction $T_i$ will typically be between 320° C. and 420° C.

The mould 200 is heated beforehand before the introduction of the thermoplastic material 6, then controlled at a first heating temperature $T_1$ of the mould throughout the duration of the introduction of the thermoplastic material. This first heating temperature $T_1$ of the mould corresponds to the surface temperature of the moulding cavities 211 of the first part 210 of the mould 200 and the temperature at the surface of the teeth 221 of the second part 210 of the mould 200 during the introduction of the thermoplastic material 6.

The first heating temperature $T_1$ of the mould is preferably close to the temperature of introduction $T_i$ of the thermoplastic material. For example, if the thermoplastic material is a polyetherimide (PEI), the first heating temperature $T_1$ of the mould will typically be between 250° C. and 420° C. According to another example, if the thermoplastic material is a polyaryletherketone (PAEK), the first heating temperature $T_1$ of the mould will typically be between 320° C. and 420° C.

The thermoplastic materials can be degraded if they are exposed to high temperatures for too long. Thus, preferably, the duration of the introduction of the thermoplastic material into the heated mould does not exceed a reference maximum time $t_{réf}$. This reference maximum time $t_{réf}$ corresponds to 80% of the degradation time $t_{dég\text{-}T_i}$ of the thermoplastic material at the chosen temperature of introduction $T_i$. The reference maximum time $t_{réf}$ is therefore calculated according to the following formula:

$$t_{réf} = 0.8 \times t_{dég-T_i} \quad \text{[Math. 6]}$$

For example, for a temperature of introduction $T_i$=400° C., the degradation time $t_{dég\text{-}400°\ C.}$ of the polyetherimide (PEI) is 10 minutes. The reference maximum time $t_{réf}$ will therefore be 8 minutes in this configuration.

In addition, the holding of the mould in the partially-open position can be restrictive and difficult to maintain beyond a certain duration, depending on the tool chosen. Thus, preferably, the duration of holding in the partially-open position of the mould $t_{inter}$ does not exceed a maximum time for holding in the partially-open position $t_{inter\text{-}max}$, depending on the tool used. The closure-compression time $t_{compression}$ is also defined, which corresponds to the duration of closure of the mould during the filling step, in other words the duration between the moment when the mould starts to close and the end of the filling step if the mould is not completely closed at the end of the filling step. Thus, if the mould is not completely closed when the filling step is achieved, as in the example illustrated in FIG. 6, the total closure time of the mould corresponds to the sum of the closure-compression times, which corresponds to the closure time during the filling step, and to the closure-compacting time, which corresponds to the closure time during the compacting step.

Consequently, the sum of the duration of holding in the partially-open position of the mould $t_{inter}$ and of the closure-compression time $t_{compression}$ is preferably less than the reference maximum time $t_{réf}$, and preferably less than the sum of the maximum holding time in the open position $t_{inter\text{-}max}$ and closure-compression time $t_{compression}$, i.e.:

$$t_{inter} + t_{compression} \le t_{réf} \quad \text{[Math. 7]}$$

and $$t_{inter} + t_{compression} \le t_{inter-max} + t_{compression} \quad \text{[Math. 8]}$$

In order to ensure the complete filling of the plurality of cavities 211 of the mould 200 in a time less than the reference maximum time $t_{réf}$ and less than the sum of the maximum time for holding in the open position $t_{inter\text{-}max}$ and the closure-compression time $t_{compression}$, the introduction of the thermoplastic material 6 is preferably carried out at a flow rate greater than reference minimum flow rate $Q_{réf}$. This reference minimum flow rate is chosen as a function of the total volume of thermoplastic material introduced $V_{total}$ and the lowest of the times between the reference maximum time $t_{réf}$ and the sum the maximum time of holding in the open position $t_{inter\text{-}max}$ and the closure-compression time $t_{compression}$. Thus, the reference minimum flow rate $Q_{réf}$ corresponds to the ratio between the total volume of thermoplastic material introduced $V_{total}$ and the lowest preceding time. The reference minimum flow rate $Q_{réf}$ is therefore calculated according to the following formula:

$$Q_{réf} = \frac{V_{total}}{\min\left(t_{réf};\ t_{inter-max} + t_{compression}\right)} \quad \text{[Math. 9]}$$

For example, for a polyetherimide (PEI) introduced at a temperature $T_i$=400° C., the reference maximum time $t_{réf}$ will be 8 minutes, i.e. 480 seconds, as previously calculated. In this example, the maximum time in the open position $t_{inter\text{-}max}$ is 7 minutes and the closure-compression time $t_{compression}$ is 15 minutes. The sum of the two will therefore be greater than the reference maximum time $t_{réf}$. If the total volume of polyetherimide (PEI) to be introduced $V_{total}$ is 600 $cm^3$, the reference minimum flow rate $Q_{réf}$ will therefore be 1.25 $cm^3$ per second in this configuration.

Starting from the value of the reference minimum flow rate $Q_{réf}$, it is possible to determine an optimum flow rate value $Q_{opti}$ while seeking to reduce the injection pressure and the closing force of the mould required to ensure complete filling of the cavities. The optimum flow rate value $Q_{opti}$ is preferably greater than or equal to the value of the reference minimum flow rate $Q_{réf}$, i.e.:

$$Q_{opti} \ge Q_{réf} \quad \text{[Math. 10]}$$

In order to precisely determine the optimum flow rate $Q_{opti}$ for introducing the thermoplastic material, tests are carried out enabling the filling of the plurality of cavities of the mould to be analysed, for example by a rheological study.

The thermal control carried out during this filling step makes it possible to obtain satisfactory filling of all the moulding 211 cavities, including the cavities furthest away from the injection points 250, while preventing any obstruction of the channels between the moulding cavities 211.

When the filling step is completed, i.e. when all the moulding cavities 211 are filled, a compacting step is carried out. During this compacting step, a suitable holding pressure is applied on the injected thermoplastic material. The holding pressure applied on the thermoplastic material is typically between 50 bars and 2000 bars. The holding pressure can be constant, as in the example illustrated in FIG. 6, or increasing or decreasing during the compacting step. The holding pressure may vary. A holding pressure can start to be applied from the filling step, in particular in order to reach a sufficient holding pressure from the start of the compacting step.

Preferably, the mould has started to close during the filling step and is not yet closed when the compacting step starts. Typically, the mould finishes closing during the compacting step, and preferably finishes closing at the end of the compacting step.

In addition, throughout the duration of the compacting step, the mould is cooled in a controlled manner from the first temperature $T_1$ to a second temperature $T_2$, which is preferably close to the setting temperature of the thermoplastic material.

This second temperature $T_2$ corresponds to the surface temperature of the moulding cavities 211 of the first part 210 of the mould 200 and the temperature at the surface of the teeth 221 of the second part 220 of the mould 200 during the compacting of the thermoplastic material.

The cooling rate $v_2$ of the mould during the compacting step is typically between 30° C. per minute and 100° C. per minute. Thus, the duration of compacting $t_{comp}$ of the thermoplastic material corresponds to the ratio of the difference between the first temperature $T_1$ and the second temperature $T_2$ divided by the cooling rate $v_2$, i.e.:

$$t_{comp} = \frac{T_1 - T_2}{v_2} \quad \text{[Math. 11]}$$

For example, if the thermoplastic material is a polyetherimide (PEI), the second temperature $T_2$ will typically be between 190° C. and 250° C., because the setting temperature of the polyetherimide (PEI) is approximately 240° C.

According to another example, if the thermoplastic material is a polyaryletherketone (PAEK), the second temperature $T_2$ will typically be between 300° C. and 320° C., because the setting temperature of the polyaryletherketone (PAEK) is approximately 300° C.

When the compacting step is completed, in other words when the second temperature $T_2$ is reached at the surface of the moulding cavities 211 and at the surface of the teeth 221, an additional cooling step can be carried out. During this cooling step, there is no longer any holding pressure exerted on the thermoplastic material, and the mould is closed.

During this cooling step, the mould is cooled in a controlled manner from the second temperature $T_2$ to a third temperature $T_3$, which is preferably sufficiently low to enable the ejection of the thermoplastic material. This additional cooling step can also enable a sufficiently low temperature of the thermoplastic material to be reached, in order to facilitate removal from the mould and handling of the moulded part.

This third temperature $T_3$ corresponds to the surface temperature of the moulding cavities 211 of the first part 210 of the mould 200 and the temperature at the surface of the teeth 221 of the second part 210 of the mould 200 during the additional cooling step of the thermoplastic material.

The cooling rate $v_3$ of the mould during the additional cooling step is controlled, and typically between 30° C. per minute and 100° C. per minute. Thus, the additional cooling duration $t_{refr}$ of the thermoplastic material corresponds to the ratio of the difference between the second temperature $T_2$ and the third temperature $T_3$ divided by the cooling rate $v_3$, i.e.:

$$t_{refr} = \frac{T_2 - T_3}{v_3} \quad \text{[Math. 12]}$$

For example, if the thermoplastic material is a polyetherimide (PEI), the third temperature $T_3$ will typically be less than 190° C., because the desired ejection temperature for the polyetherimide (PEI) is approximately 180° C.

According to another example, if the thermoplastic material is a polyaryletherketone (PAEK), the third temperature $T_3$ will typically be less than 300° C., because the desired ejection temperature for the polyaryletherketone (PAEK) is approximately 300° C.

The additional cooling step is optional. More specifically, the second temperature $T_2$ can, in certain cases, already be sufficiently low to enable the ejection of the thermoplastic material. This configuration can for example be present if the thermoplastic material is a polyaryletherketone (PAEK), because the setting temperature of polyaryletherketone (PAEK) is close or even identical to the desired ejection temperature. However, this additional cooling step remains desirable for obtaining a sufficiently low temperature of the thermoplastic material in order to be able to easily handle the moulded part once removed from the mould.

When the additional cooling step is completed, the part thus moulded is sufficiently cold to be able to be removed from the mould, by separating the first part 210 of the mould 200 from the second part 220 of the mould 200.

Thus a complex multielement acoustic component is obtained, comprising a plurality of complex hollow acoustic elements, for which the width and/or the length can exceed 200 mm. The wall thickness of the complex hollow acoustic elements, and/or of the edges separating the hollow acoustic elements, can be less than 0.5 mm.

In the example illustrated in FIG. 5, the tool 2 is intended to produce pyramid-shaped complex hollow acoustic elements. However, it does not go beyond the scope of the invention if the tool enables the production of hollow acoustic elements having, for example, a conical, spiral, funnel or other shape. By contrast, the shape chosen for the complex hollow acoustic elements preferably enables their removal from the mould.

Below, a method is described, with reference to FIGS. 7 and 8, for producing an exemplary acoustic attenuation structure in accordance with an embodiment of the invention. In this case, the acoustic attenuation structure 300 comprises an acoustic skin or plate 310, a multielement acoustic component 320 produced as described above, a plurality of partitions 331 and a closure skin or plate 340.

The closure skin 340 corresponds to a solid surface intended to reflect sound waves entering the acoustic attenuation structure. The closure skin can be a constituent element of the acoustic attenuation structure, as in the example described here, or correspond to a structure of an object, for example an aircraft engine. In this latter case, the acoustic attenuation structure of the invention does not comprise a closure skin and is mounted directly on the structure of the object.

The acoustic skin 310 has the function of allowing the sound waves to be attenuated to pass into the interior of the acoustic attenuation structure 300. For this purpose and in the example described here, the acoustic skin 310 comprises a plurality of perforations 311.

The acoustic component 320 is formed in a single part and extends in length and in width along a horizontal direction $D_H$ and in height along a vertical direction $D_V$. The acoustic component comprises a plurality of complex hollow acoustic elements 321 each having a shape tapering gradually between a base 322 and an apex 323.

In the example described here, the complex acoustic elements 321 have a pyramid shape. The base 322 of each complex acoustic element 321 is in continuous contact with the base of the adjacent complex acoustic elements, so as to form a continuous network of edges 324.

In the exemplary embodiment described here, the plurality of partitions 331 is produced in a single part, namely a network of ribs 330 which, once assembled with the complex multielement acoustic panel 320, forms the partitions around the complex acoustic elements 321.

Still in the example described here, the acoustic attenuation structure 300 is produced by assembling the complex multielement acoustic panel 320 with the plurality of partitions 331 in a single piece, the upper edge 331*a* of the partitions 331 being fixed, for example by bonding or welding, on the lower portion 322*b* of the bases 322 of the complex acoustic elements 321, as illustrated in FIG. 8. The plurality of complex acoustic elements being formed in a single part within the complex multielement acoustic panel and the plurality of partitions being itself also formed in a single part, the assembling of the two elements is largely facilitated by the auto-positioning of the complex acoustic elements with the partitions.

The closure skin 340 is fixed, for example by bonding or welding, on the lower edge 331*b* of the partitions 331, while the acoustic skin 310 is fixed, by bonding or welding, on the upper portion 322*a* of the bases 322 of the complex acoustic elements 321 corresponding to the exposed surface of the edges 324. Hence, the acoustic skin and the closure skin are each fixed on a perfectly flat support following the horizontal direction $D_H$, which makes it possible to ensure very good sealing between the skins and the assembly of the complex multielement acoustic panel with the plurality of partitions.

Once assembled, the attenuation structure 300 comprises a plurality of acoustic cells 350, each formed by a complex acoustic element 321 and the partitions 331 which surround it, as illustrated in FIG. 8. The height H321 of the complex acoustic elements 321 is less than the height H350 of the acoustic cells 350. More precisely, the height H321 of the acoustic cells is between 10% and 99% of the height H350 of the acoustic cells in the vertical direction. The height H321 can be between 5 mm and 100 mm whereas the base of each element 321 can be inscribed in a circle of diameter between 5 mm and 50 mm. In addition, through the production method of the invention, the complex hollow acoustic elements 321 have a very low thickness E321, less than 1 mm and typically between 0.3 mm and 0.5 mm.

The plurality of partitions and the closure skin can be produced by injection of a thermoplastic or thermosetting material, with or without filler, by injection-compression of a thermoplastic or thermosetting material, with or without filler, or by injection with temperature control of the tool of a thermoplastic or thermosetting material, with or without filler. The acoustic skin can be produced by manual or automatic draping of a composite material with thermoplastic or thermosetting matrix.

The plurality of partitions and the closure skin, as well as the assemblies joining together in a single piece the plurality of partitions and the complex multielement acoustic panel or the plurality of partitions and skins, can also be produced by injection of a thermoplastic or thermosetting material, with or without filler. The plurality of partitions can also be obtained by using a honeycomb structure, for example made of aluminium or Nomex®.

Although the present invention has been described by referring to specific exemplary embodiments, it is obvious that modifications or changes can be made to these examples without going beyond the general scope of the invention as defined by the claims. Consequently, the description and the drawings should be considered as illustrating rather than limiting.

The expression "between" should be understood as including the limits.

The invention claimed is:

1. A method for producing a component comprising a plurality of complex hollow elements, each having a shape tapering gradually between a base and an apex, the complex hollow elements being connected to one another by one or more adjacent edges, the method comprising: filling, by a thermoplastic material, of a plurality of moulding cavities of a mould having a shape corresponding to the shape of the complex hollow elements of the component to be produced, the mould being held at a first temperature greater than the setting temperature of the thermoplastic material, then applying a holding pressure on the thermoplastic material while the mould is cooled until reaching a second temperature, wherein said holding pressure is applied during a compacting step by the mould and wherein the mould starts closing during the filling and finishes closing during the compacting step, interrupting the holding pressure on the thermoplastic material while the mould is cooled until reaching a third temperature, and removing a complex multielement component comprising a plurality of complex hollow elements from the mould.

2. The production method according to claim 1, wherein the mould comprises a first part which comprises the plurality of moulding cavities, and a second part located facing the first part, the filling of the moulding cavities by the thermoplastic material being carried out while the first part and the second part of the mould are spaced apart by an opening distance strictly greater than the value of the thickness of the multielement component to be produced, and the cooling from the second temperature to the third temperature being carried out while the first part and the second part of the mould are spaced apart by a distance corresponding to the thickness of the multielement component to be produced.

3. The production method according to claim 1, wherein the holding pressure on the thermoplastic material is between 50 bar and 2000 bar.

4. The production method according to claim 1, wherein the flow rate of thermoplastic material during filling is greater than a minimum flow rate corresponding to the ratio between the volume of thermoplastic material used and 80% of the degradation time of the thermoplastic material at the injection temperature chosen.

5. The production method according to claim 1, wherein the thermoplastic material is a polyetherimide, the first temperature being between 250° C. and 420° C., the second temperature being between 190° C. and 250° C. and the third temperature being less than 190° C.

6. The production method according to claim 1, wherein the thermoplastic material is a polyaryletherketone, the first temperature being between 320° C. and 420° C. and the third temperature being less than 300° C.

7. The production method according to claim 1, wherein the thickness of the walls of the complex elements produced is less than 0.5 mm.

8. The production method according to claim 1, wherein the length and the width of the complex multielement component produced are greater than 200 mm.

9. A method for making an acoustic attenuation structure comprising:

producing a complex multielement acoustic component according to the method as defined in claim 1, producing a complex multielement acoustic panel comprising the complex multielement acoustic component and a plurality of partitions forming acoustic cavities, each complex hollow element of the acoustic component being housed in an acoustic cavity so as to form an acoustic cell, and assembling a face of the complex multielement acoustic panel with an assembly face of an acoustic skin.

* * * * *